(12) United States Patent
Marshall et al.

(10) Patent No.: US 10,655,026 B2
(45) Date of Patent: May 19, 2020

(54) WATER-BASED COATINGS

(71) Applicants: Bruce Marshall, Fort Mill, SC (US); Mike Schmidt, Ft. Mill, SC (US); Ralph Arcurio, Bridgewater, NJ (US); SUN CHEMICAL CORPORATION, Parsippany, NJ (US)

(72) Inventors: Bruce Marshall, Fort Mill, SC (US); Mike Schmidt, Ft. Mill, SC (US); Ralph Arcurio, Bridgewater, NJ (US)

(73) Assignee: Sun Chemical Corporation, Parsippany, NJ (US)

(*) Notice: Subject to any disclaimer, the term of this patent is extended or adjusted under 35 U.S.C. 154(b) by 0 days.

(21) Appl. No.: 15/113,280

(22) PCT Filed: Jan. 7, 2015

(86) PCT No.: PCT/US2015/010432
§ 371 (c)(1),
(2) Date: Jul. 21, 2016

(87) PCT Pub. No.: WO2015/112334
PCT Pub. Date: Jul. 30, 2015

(65) Prior Publication Data
US 2016/0333207 A1 Nov. 17, 2016

Related U.S. Application Data

(60) Provisional application No. 61/931,000, filed on Jan. 24, 2014.

(51) Int. Cl.
| C09D 11/107 | (2014.01) |
| C09D 11/104 | (2014.01) |
| C09D 133/26 | (2006.01) |
| C09D 5/02 | (2006.01) |
| C09D 7/63 | (2018.01) |
| B41F 23/04 | (2006.01) |
| C09D 5/08 | (2006.01) |
| C09D 11/023 | (2014.01) |
| C09D 11/037 | (2014.01) |
| C09D 11/322 | (2014.01) |
| C09D 11/38 | (2014.01) |
| C09D 163/10 | (2006.01) |
| C08K 3/34 | (2006.01) |
| C08K 3/36 | (2006.01) |

(52) U.S. Cl.
CPC ............ *C09D 11/107* (2013.01); *B41F 23/04* (2013.01); *C09D 5/022* (2013.01); *C09D 5/024* (2013.01); *C09D 5/08* (2013.01); *C09D 7/63* (2018.01); *C09D 11/023* (2013.01); *C09D 11/037* (2013.01); *C09D 11/104* (2013.01); *C09D 11/322* (2013.01); *C09D 11/38* (2013.01); *C09D 133/26* (2013.01); *C09D 163/10* (2013.01); *C08K 3/346* (2013.01); *C08K 3/36* (2013.01); *C08L 2201/54* (2013.01); *C08L 2205/22* (2013.01); *C08L 2312/00* (2013.01)

(58) Field of Classification Search
CPC ...... C09D 11/023; C09D 11/107; C09D 7/63; C09D 5/024; C09D 133/26; C09D 163/10; C09D 11/38; C09D 11/322; C09D 11/037; C09D 5/08; C09D 5/022; C09D 11/104; B41F 23/04; C08L 2312/00; C08L 2205/22; C08L 2201/54; C08K 3/36; C08K 3/346
See application file for complete search history.

(56) References Cited

U.S. PATENT DOCUMENTS

| 5,026,755 | A | 6/1991 | Kveglis et al. |
| 6,127,094 | A | 10/2000 | Victor et al. |
| 6,639,006 | B1 | 10/2003 | Cottrell et al. |
| 2002/0107303 | A1 | 8/2002 | Miyabashi et al. |
| 2002/0170451 | A1 | 11/2002 | Nakazawa et al. |
| 2003/0029355 | A1 | 2/2003 | Miyabayashi |
| 2003/0212182 | A1* | 11/2003 | Kayima ............ C08G 63/21 524/457 |
| 2012/0026238 | A1* | 2/2012 | Ganapathiappan .... C09D 11/30 347/20 |
| 2013/0065467 | A1* | 3/2013 | Transvalidou .......... B32B 27/12 442/166 |

FOREIGN PATENT DOCUMENTS

| JP | H09 291186 A | 11/1997 |
| JP | 2005029515 A * | 2/2005 |
| JP | 2006 206802 A | 8/2006 |
| WO | WO 03/046039 A1 | 6/2003 |
| WO | WO 2005/059046 A1 | 6/2005 |
| WO | WO 2010/120278 A1 | 10/2010 |

OTHER PUBLICATIONS

International Preliminary Report issued in PCT Application No. PCT/US2015/010432 dated Jul. 26, 2016.
(Continued)

Primary Examiner — Michael Robinson
(74) Attorney, Agent, or Firm — Charles C. Achkar; Ostrolenk Faber LLP

(57) ABSTRACT

The present invention is directed to a water-based printing ink or coating composition comprising an acrylic resin emulsion and an epoxy ester resin dispersion. The present invention also provides a process for preparing the printing ink or coating composition comprising forming an emulsion of an acrylic resin having the general formula I by copolymerizing monomers in water, forming an epoxy ester resin dispersion by adding the epoxy ester resin to a solvent and combining the acrylic resin emulsion and the epoxy resin ester dispersion to provide the composition. Finally the present invention provides a process for preparing an article with a coating or an ink printed thereon which comprises applying the ink or coating composition to a surface of an article and drying the composition. The compositions exhibit a high degree of alkali resistance, acid resistance and/or water softener resistance.

24 Claims, No Drawings

(56) References Cited

OTHER PUBLICATIONS

PCT International Search Report issued in PCT/US2015/010432 dated Apr. 10, 2015.
Written Opinion of International Searching Authority issued in PCT/US2015/010432 dated Apr. 10, 2015.
Supplementary European Search Report issued in European Patent Application 15 74 1006 dated Aug. 21, 2017.

* cited by examiner

WATER-BASED COATINGS

CROSS REFERENCE TO RELATED APPLICATIONS

The present application is a § 371 National Phase application based on PCT/US2015/010432 filed Jan. 7, 2015, which claims the benefit of U.S. Provisional Application No. 61/931,000 filed Jan. 24, 2014, the subject matter of each of which is incorporated herein by reference in their entirety.

FIELD OF THE INVENTION

The present invention relates to water-based ink or coating compositions, which exhibit good weatherability and are thus particularly useful for printing or coating onto articles used primarily outside.

BACKGROUND OF THE INVENTION

U.S. Pat. No. 3,951,892 discloses water-based styrenic inks adapted for use in coating cellulosic substrates under ambient conditions.

Inks and coatings that are applied to articles that are primarily used outside such as boxes, containers, sacks and bags which must exhibit a high degree of alkali resistance, acid resistance and/or water softener resistance.

However, commercially available ink and coating compositions intended for outside use typically contain hazardous materials such as aziridine or metal oxide/alkoxide crosslinkers. Consequently, it would be advantageous to provide compositions that do not contain such hazardous materials.

It has now been found that compositions comprising a crosslinkable acrylic resin emulsion and an epoxy ester resin dispersion do not require the incorporation of hazardous materials and exhibit good weatherability when applied to articles primarily for outdoor use.

In particular, the compositions according to the present invention provide coatings that exhibit product resistance properties which are equal to commercially available inks whilst eliminating the need to use aziridine or metal oxide/alkoxide crosslinkers, and thus eliminating the health and safety issues associated with these materials.

SUMMARY OF THE INVENTION

The present invention provides a water-based printing ink or coating composition comprising an acrylic resin emulsion and an epoxy ester resin dispersion wherein the acrylic resin has the general formula I:

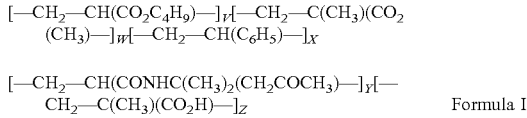

Formula I and wherein the monomer units v, w, x, y and z are present in the copolymer in the amounts of v between 0-60 wt %, w between 0-60 wt %, x between 0-40 wt %, y between 1-10 wt % and z between 0.1-5 wt %.

The present invention also provides a process for preparing the printing ink or coating composition comprising
  a) forming an emulsion of an acrylic resin having the general formula I by copolymerizing the monomers in water;
  b) forming an epoxy ester resin dispersion by adding the epoxy ester resin to a solvent and
  c) combining the acrylic resin emulsion and the epoxy resin ester dispersion to provide the composition.

Finally the present invention provides a process for preparing an article with a coating or an ink printed thereon which comprises
  a) applying the ink or coating composition to a surface of an article and
  b) drying the composition.

These and other objects, advantages, and features of the invention will become apparent to those persons skilled in the art upon reading the details of the methods and formulations as more fully described below.

DETAILED DESCRIPTION OF THE INVENTION

The compositions of the present invention are water-based which cure very rapidly providing a dried film that exhibits alkali resistance, acid resistance, water softener resistance, and a resistance to a wide range of chemical products such as those used for horticultural purposes i.e. fertilizers and weed killers.

In particular, the compositions exhibit superior resistance to alkali than commercially available inks and can typically withstand alkali resistance testing to greater than 60 seconds, whereas commercially available inks exhibit ink removal under these conditions.

Alkali resistance is a particularly important performance characteristic for many outdoor sack manufacturers and end-users.

The inks or coating compositions comprise an acrylic resin copolymer which is made up of monomer units selected from butyl acrylate v, methyl methacrylate w, styrene x, diacetone acrylamide y and methacrylic acid z.

The monomer units v, w, x, y and z are present in the copolymer in the amounts of v between 0-60 wt %, w between 0-60 wt %, x between 0-40 wt %, y between 1-10 wt % and z between 0.1-5 wt %.

Preferably, the monomer units v, w, x, y and z are present in the copolymer in the amounts of v between 10-50 wt %, w between 10-50 wt %, x between 10-30 wt %, y between 2-8 wt % and z between 0.5-4 wt %.

Advantageously, the monomer units v, w, x, y and z are present in the copolymer in the amounts of v between 30-40 wt %, w between 30-40 wt %, x between 15-25 wt %, y between 5-7 wt % and z between 1-3 wt %.

The composition preferably contains between 10-30 wt % of acrylic resin emulsion, between 5-75 wt % of epoxy ester resin dispersion and between 2-15 wt % of water.

Typically the emulsion contains between 30-50 wt % of acrylic resin, preferably between 35-45 wt % and most preferably between 38-41 wt %.

Advantageously the dispersion contains between 10-15 wt % of epoxy ester resin and preferably contains between 11-13 wt % of epoxy ester resin.

The composition may or may not contain a pH sensitive crosslinker such as dihydrazide crosslinker. However, in the embodiment of the present invention wherein the composition does not include a dihydazide crosslinker the resistance properties of the finished ink or coating are typically compromised.

The crosslinker is typically present in the amount of 0.01-5 wt %, such as 0.1 to 1 wt %.

In a preferred embodiment a dihydrazide crosslinker is incorporated into the acrylic resin and the ratio of acrylic resin to crosslinker is preferably between 25:1 to 50:1 and advantageously between 35:1 to 45:1 e.g. 38:1.

In an alternative embodiment the dihydrazide is not incorporated into the acrylic resin but added to the composition immediately prior to printing or coating the article.

Advantageously, the dihydrazide crosslinker is adipic dihydrazide.

The composition preferably comprises a styrene maleic anhydride resin. Typically the styrene maleic anhydride resin is in aqueous solution.

The aqueous styrene maleic anhydride resin solution usually comprises between 60-85% water, and advantageously between 70-80 wt % water such as 75 wt % water. Preferably the composition comprises between 2-12 wt % of aqueous styrene maleic anhydride resin solution comprising between 60-85 wt % water.

The composition may also contain a defoamer such as Dapro DF-975 or Rhodoline 679 and preferably contains between 0.1-3 wt % of defoamer.

The composition may also contain clay such as 1-20 wt % of clay and may also contain silica such as 1-5 wt % of silica and may also contain dimethylethanolamine, such 1-5 wt % of dimethylethanolamine.

In another embodiment the composition may comprise a further polymeric component selected from the group consisting of alkyd, rosinated alkyd, polyester, acrylic, epoxy, melamine-formaldehyde, urea-formaldehyde, nitrocellulose, cellulosic, polyester-urethane and urethane.

Wherein the composition further includes epoxy this is typically in the weight range of 1-5 wt % and advantageously contains beween 2-4 wt %.

Wherein the composition contains a further polymeric component selected from the group consisting of alkyd, rosinated alkyd, polyester, acrylic, melamine-formaldehyde, urea-formaldehyde, nitrocellulose, cellulosic, polyester-urethane and urethane these are typically present in the amount of between 0.1-1 wt %.

This further polymeric component is typically incorporated into the compositions to improve wet ink film properties such as wetting and flow and/or dry film properties such as gloss, adhesion and rub and mar resistance.

Additionally the composition may also comprise one or more oxygen-containing water-tolerant solvents such as 1-propoxy-2-propanol, n-propanol, isopropanol, ethyl alcohol and other lower alcohols.

Advantageously the composition contains between 0.1-2 wt % oxygen-containing water-tolerant solvent which is typically added to the composition to adjust the drying speed and also to incorporate foam control.

Finally the composition may optionally contain other components which may be selected from one or more organic or inorganic pigments or dyes, pigment dispersants and surfactants. Typically the epoxy ester dispersion functions as a pigment dispersant.

Preferably the composition contains between 25-40 wt % pigment and advantageously between 30-35 wt %.

The compositions may further comprise polyethylene wax emulsions such as Sunwax G-35 or Poly Emulsion 325N35. The polyethylene wax emulsions are typically present in the amount of 2-30 wt %, such as 5-15 wt %.

Finally the compositions according the present invention are essentially free of aziridine or metal oxide/alkoxide crosslinkers.

In a preferred embodiment, the particle size of the acrylic resin emulsion of Formula I has a D90 mean particle size (as measured by the test method set out in example 5) below about 200 nm, more preferably below about 100 nm, and most preferably below about 80 nm such as between 1-50 nm.

The particle size within the above ranges provides an indication that the polymerization reaction was conducted successfully in terms of reaction rate and/or yield.

The composition preferably has a viscosity range of between 10-150 cps, such as 30-120 cps e.g. 50-100 cps when typically run at 9-13 seconds on a number 3 Signature Zahn cup at room temperature.

The present invention also provides a process for preparing the printing ink or coating composition comprising
 a) forming an emulsion of an acrylic resin having the general formula I by copolymerizing the monomers in water;
 b) forming an epoxy ester resin dispersion by adding the epoxy ester resin to a solvent and
 c) combining the acrylic resin emulsion and the epoxy resin ester dispersion to provide the composition.

Initially the acrylic resin copolymer of formula I is prepared by copolymerizing acrylate, methyl methacrylate, styrene, diacetone acrylamide and methacrylic acid monomer units in water to form an emulsion.

Advantageously the acrylic resin emulsion is prepared by emulsion polymerization and the reation temperature is preferably between 75-85° C. such as 77-84° C.

In a preferred embodiment a dihydrazide crosslinker is incorporated into the reaction mixture.

Typically a neutralizing agent is used during the synthesis of the copolymer of formula I such that the pH is maintained above 7 which prevents the dihydrazide from crosslinking. Advantageously the neutralizing agent is selected from sodium hydroxide, potassium hydroxide, ammonia, 2-(methylamino)ethanol or N,N-dimethylethanolamine.

This is advantageous in that during printing and drying of the finished ink or coating the neutralizing agent is driven off allowing the pH to fall below 7, causing the dihydrazide to crosslink and providing the finished ink or coating with improved resistance properties.

The acylate resin emulsion is typically mixed with other components to provide a blend vehicle.

The other components usually included in the blend vehicle include various waxes such as polyethylene or polypropylene waxes and these are added to improve rub resistance or for modifying the coefficient of friction.

An epoxy ester resin dispersion is then prepared and this is typically done by adding the epoxy ester resin to a solvent and dimethylethanol amine (DMEA) and mixed to provide a homogenous solution to which water and a pigment may be added.

The blend vehicle comprising the acrylic resin emulsion and the epoxy ester resin dispersion are then combined.

Usually the ratio of the blend vehicle to dispersion is between 0.1 wt % to 70 wt % and 30 wt % to 99.9 wt %.

In a particular embodiment the following compositions which are advantageously used on outdoor bags are prepared as follows;

A blend vehicle containing an emulsion of acrylic resin having the general formula I, a styrene maleic anhydride resin, an elastomeric silicone, clay, silica, polyethylene wax emulsion, dimethylethanol amine (DMEA), and a defoamer is produced. The combination of these materials results in the clay and silica being dispersed more thoroughly and prevents them settling out from the blend vehicle.

The blend vehicle is then mixed with epoxy ester dispersions to make the finished ink, which is preferably applied to a high-density polyethylene film using a flexographic press.

Finally the present invention provides a process for preparing an article with a coating or an ink printed thereon which comprises
 a) applying the ink or coating composition to a surface of an article and
 b) drying the composition.

Suitable articles to which the inks or coatings are applied thereto include storage articles such as bags, boxes, containers and sacks. The articles may also include packaging materials and covers. These articles may be made from high-density polyethylene or low density polyethylene and they may include opaque films or orientated polypropylene films which may or may not include a woven backing.

The inks and coating compositions may be applied using flexographic printing, but the rheological properties such as viscosity could be adjusted by the addition of water such that they could be used in gravure, lithographic and screen printing processes as well.

Preferably the compositions are applied with a coating weight ranging from 0.3 to 1.5 lbs per ream.

Finally the compositions of the present invention also exhibit good resolubility on press to allow inks to run cleanly without stopping to clean the plates and aniloxes during the printing process.

The present invention has been described in detail, including the preferred embodiments thereof. However, it will be appreciated that those skilled in the art, upon consideration of the present disclosure, may make modifications and/or improvements on this invention that fall within the scope and spirit of the invention.

EXAMPLES

The following examples illustrate specific aspects of the present invention and are not intended to limit the scope thereof in any respect and should not be so construed.

Example 1—Water-Based Blue Finished Ink According to the Present Invention

| Material | % |
|---|---|
| B-153605 Decosperse Blue 15:3 EP (Epoxy ester resin dispersion, Decorative Color) | 60.00 |
| Formula I resin wherein v = 35 wt %, w = 34 wt %, x = 23 wt %, y = 6 wt % and z = 2 wt % w/adipic dihydrazide at 38:1 ratio | 16.65 |
| Dapro DF-975 defoamer (Elementis) | 1.10 |
| DMEA | 1.25 |
| SMA17352F (resin, Cray Valley) Solution in 75% water | 6.00 |
| ASP 600 Clay (BASF) | 3.00 |
| Imsil A-30 silica (Cary) | 2.00 |
| Sunwax G-35 (Chemcor) | 9.00 |
| Dow Corning 85 additive | 1.00 |
| Total | 100.00 |

Example 2—Water-Based Light Orange Finished Ink According to the Present Invention

| Material | % |
|---|---|
| Decosperse Yellow 74 EP (Epoxy ester resin dispersion, Decorative Color) | 0.70 |
| Decosperse Red 254 EP (Epoxy ester resin dispersion, Decorative Color) | 0.30 |
| EPOTUF EA-6891 91263 (epoxy ester resin - Reichhold) | 10.00 |
| Water | 8.5 |
| Formula I resin wherein v = 35 wt %, w = 34 wt %, x = 23 wt %, y = 6 wt % and z = 2 wt % | 29.5 |
| Dapro DF-975 defoamer (Elementis) | 1.25 |
| DMEA | 2.25 |
| SMA17352 Solution (Cray Valley) | 8.00 |
| ASP 600 Clay (BASF) | 13.50 |
| Imsil A-30 silica (Cary) | 2.50 |
| Sunwax G-35 (Chemcor) | 22.50 |
| Dow Corning 85 additive | 1.00 |
| Total | 100.00 |

Example 3—Aquaverse P-7417 RED AQVWR VIN (Sun Chemical)

Comparative Water-Based Ink Containing Aziridine Intended for the Same Substrates and Applications as the compositions according to the present invention.

Example 4—Ultrasak CL PRO Green (Sun Chemical)

Comparative water-based ink containing aziridine intended for the same substrates and applications as the compositions according to the present invention.

Preparation of Prints for Testing

The viscosity of the ink samples is measured and adjusted with water to the desired viscosity (9-13 sec. #3 Signature Zahn cup). The high-density polyethylene film being used is placed on a smooth, flat surface. Approximately 0.5 grams of ink is applied to a 360-line/6.9 volume Pamarco 2-roll handproofer with a 50/55 durometer rubber roller.

The handproofer is pulled across the substrate, transferring the ink from the handproofer to the substrate.

Finally the prepared print is dried using a forced air heat gun with four quick passes over the print to simulate drying that will occur on press. The print sample is then allowed to cure at room temperature for 16-24 hours to achieve full cure.

Performance properties for inventive vs. comparative inks are shown in the table 1 below.

TABLE 1

| | | Performance Properties | | |
|---|---|---|---|---|
| Property/Test Method | Pass/Fail Criteria | Examples 1 & 2 (Inventive) | Example 3 (Comparative) | Example 4 (Comparative) |
| Coefficient of Friction (COF): Place a print sample on 200 gm. sled. Place another print sample on bed that is at least 12 inches long. Run test at speed 6 in./minute for a distance of 4 inches. Repeat for a total of 3 runs. Report average results. | Pass: Static >0.300 Fail: Static <0.300 | Avg. 0.363 Pass | Avg. 0.334 Pass | Avg. 0.372 Pass |

TABLE 1-continued

Performance Properties

| Property/Test Method | Pass/Fail Criteria | Examples 1 & 2 (Inventive) | Example 3 (Comparative) | Example 4 (Comparative) |
| --- | --- | --- | --- | --- |
| Block Test: Spring Block Tester. Samples placed print to print and print to unprinted, treated side of film in the block tester. Set block tester to 100 psi and place block tester in humidity chamber set at 120 F./80% RH for 2 hours. Remove from tester. Allow to cool and then separate. | Pass: Minimal to no offsetting of ink on print to print and print to treated film. Slight to no cling. Fail: Moderate to extreme offsetting of ink. Moderate to extreme cling. | No ink transfer and slight to no cling Pass | No ink transfer and no cling Pass | No ink transfer and no cling Pass |
| Heat Resistance: A prepared print sample is folded over so the print sides are in contact. The folded print is then placed between the jaws of a Sentinel Heat Sealer set to 210 F., 40 psi for 4 seconds. Allow print to cool and then separate. | Pass: No offsetting and minimal to no cling Fail: Minimal to extreme offsetting and or ink sticking together | No ink transfer Pass | No ink transfer Pass | No ink transfer Pass |
| Abrasion Test: Sutherland Rub Tester. 200 cycles/4# weight. Print on 4# weight, unprinted stock on test bed | Pass: Minimal to no offsetting to unprinted film and minimal to no marring of print Fail: Moderate to extreme offsetting and marring | Slight to no ink transfer Pass | Slight ink transfer Pass | Slight ink transfer Pass |
| Adhesion Test: 3M 610 Tape applied onto the print. Rapidly pull tape off print. | Pass: Minimal to no ink removal from print Fail: 50% or more ink removal from print | No ink removal Pass | No ink removal Pass | No ink removal Pass |
| Water Resistance: Print soaked in tap water for 24 hours. Print is placed on 4-lb. weight and virgin stock is placed on bed of rub tester. Test is run for 20 cycles and removed immediately from the rub tester | Pass: Minimal to no marring of the print and no bleed into the water on virgin stock Fail: Moderate to severe marring. Any discoloration of the water is a failure | Slight to no marring of print and no water discoloration Pass | Slight marring and no water discoloration Pass | Slight marring and no water discoloration Pass |
| Alkali Resistance: pH 10 ammonia solution. One drop of solution applied to the print for 1 minute, wipe off print with paper towel. | Pass: Minimal to no ink removal from print being transferred onto the paper towel. Fail: Moderate to extreme ink removal | No ink removal from the print. No ink transfer onto the paper towel. Pass | Moderate ink removal and transfer onto paper towel Fail | Moderate ink removal and transfer onto paper towel Fail |
| Acid Resistance: Print place in 5% phosphoric acid soak for 10 min. Print removed from solution and compared to virgin print | Pass: Minimal to no loss of color or gloss Fail: Moderate to extreme loss of color or gloss | No loss of gloss or color change Pass | No loss of gloss or color change Pass | No loss of gloss or color change Pass |

The above table shows that the inks and coatings of the present invention (without aziridine) have acceptable performance properties when compared to prior art comparative inks (with aziridine). For some properties (e.g. alkali resistance), the compositions of the present invention exhibit improvement vs. the comparative inks.

Example 5—D90 Mean Particle Size Measurement 0.5 g to 1.0 g of the emulsion or dispersion was placed into a 50 ml glass beaker and sonicated for 5 minutes using the 2210 Branson sonicator model 2210.

The particle size was then determined using a Malvern Zetasizer Nano ZS Model ZEN3600 with the following parameters:
Sample:
Material: Acrylic type, RI=1.550, Absorption=0.10
Dispersant: DI Water temperature=25° C., Viscosity=0.8872 Cp, RI=1.330
General option: Use dispersant viscosity as sample viscosity.
Temperature: Temperature 25° C. & Equilibration time=0 min.
Cell type: DTS0012-Disposable sizing cuvette
Measurement:
Measurement duration: Manual
Number of runs: 1
Run duration (seconds): 1
Number measurement: 1
Measurement settings: Auto attenuation selection
Data Processing: Analysis model: General purpose (normal resolution)
Laser source: Red laser 532 nm
Light detector: Dynamic Light Scattering (DLS).

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the invention.

We claim:

1. A water-based printing ink or coating composition comprising an acrylic resin emulsion and an epoxy ester resin dispersion wherein the acrylic resin in the acrylic resin emulsion consists of an acrylic resin that has the general formula I:

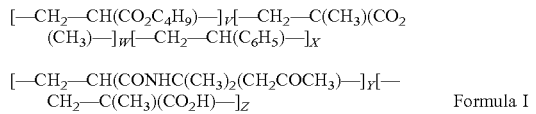

Formula I and wherein the monomer units v, w, x, y and z are present in the copolymer in the amounts of v between 10-50 wt %, w between 10-50 wt %, x between 10-30 wt %, y between 1-10 wt % and z between 0.1-5 wt %; and wherein the ink or coating composition comprises between 10-30 wt % of acrylic resin emulsion, and between 5-75 wt % of epoxy ester resin dispersion.

2. The composition according to claim 1 wherein the monomer units y and z are present in the copolymer in the amounts of y between 2-8 wt % and z between 0.5-4 wt %.

3. The composition according to claim 1 wherein the monomer units v, w, x, y and z are present in the copolymer in the amounts of v between 30-40 wt %, w between 30-40 wt %, x between 15-25 wt %, y between 5-7 wt % and z between 1-3 wt %.

4. The composition according to claim 1 comprising between 2-15 wt % of water.

5. The composition according to claim 1 further comprising a pH sensitive crosslinker.

6. The composition according to claim 5 wherein the pH sensitive crosslinker is dihydrazide crosslinker.

7. The composition according to claim 5 comprising 0.1 to 1.0 wt % of dihydrazide crosslinker.

8. The composition according to claim 6 wherein the acrylic resin to dihydrazide crosslinker has a weight ratio of between 25:1 to 50:1.

9. The composition according to claim 6 wherein the dihydrazide crosslinker is adipic dihydrazide.

10. The composition according to claim 6 further comprising a styrene maleic anhydride resin.

11. The composition according to claim 10 wherein the styrene maleic anhydride resin is in an aqueous solution before combining with composition.

12. The composition according to claim 11 wherein the aqueous styrene maleic anhydride solution comprises between 70-80 wt % water content as calculated before combining with composition.

13. The composition according to claim 1 further comprising a 2-12 wt % of aqueous styrene maleic anhydride resin solution comprising between 70-80 wt % water content as calculated before combining with composition.

14. The composition according to claim 1 further comprising a defoamer.

15. The composition according to claim 14 comprising 0.1-3 wt % of defoamer.

16. The composition according to claim 1 further comprising clay.

17. The composition according to claim 16 comprising 1-20 wt % of clay.

18. The composition according to claim 1 further comprising 1-5 wt % of silica.

19. The composition according to claim 1 further comprising 1-5 wt % of dimethylethanolamine.

20. The composition according to claim 1 further comprising a further polymeric component selected from the group consisting of alkyd, rosinated alkyd, polyester, acrylic, epoxy, melamine-formaldehyde, urea-formaldehyde, nitrocellulose, cellulosic, polyester-urethane and urethane.

21. The composition according to claim 1 further comprising one or more oxygen-containing water-tolerant solvents selected from the group consisting of 1-propoxy-2-propanol, n-propanol, isopropanol and ethyl alcohol.

22. The composition according to claim 1 further comprising components selected from one or more organic or inorganic pigments or dyes, pigment dispersants and surfactants.

23. The composition according to claim 1 which is essentially free of aziridine or metal oxide/alkoxide crosslinkers.

24. The composition according to claim 1 wherein the acrylic resin emulsion has a D90 mean particle size below about 100 nm.

* * * * *